United States Patent
Yoshida et al.

(10) Patent No.: US 12,236,704 B2
(45) Date of Patent: Feb. 25, 2025

(54) PERSON STATE DETECTION APPARATUS, PERSON STATE DETECTION METHOD, AND NON-TRANSITORY COMPUTER READABLE MEDIUM STORING PROGRAM

(71) Applicant: NEC Corporation, Tokyo (JP)

(72) Inventors: Noboru Yoshida, Tokyo (JP); Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 482 days.

(21) Appl. No.: 17/618,974

(22) PCT Filed: Jun. 26, 2019

(86) PCT No.: PCT/JP2019/025276
§ 371 (c)(1),
(2) Date: Dec. 14, 2021

(87) PCT Pub. No.: WO2020/261404
PCT Pub. Date: Dec. 30, 2020

(65) Prior Publication Data
US 2022/0366716 A1    Nov. 17, 2022

(51) Int. Cl.
*G06V 40/10*    (2022.01)
*G06T 7/73*    (2017.01)

(52) U.S. Cl.
CPC .............. *G06V 40/103* (2022.01); *G06T 7/73* (2017.01)

(58) Field of Classification Search
CPC .................................. G06V 40/103; G06T 7/73
See application file for complete search history.

(56) References Cited

U.S. PATENT DOCUMENTS

| | | | |
|---|---|---|---|
| 9,739,599 B2* | 8/2017 | Srinivasan | G06T 7/74 |
| 10,002,460 B2* | 6/2018 | Black | G06Q 30/0601 |
| 10,482,613 B2* | 11/2019 | Radwin | G06F 18/00 |
| 11,837,006 B2* | 12/2023 | Dong | G06V 10/462 |
| 2012/0281918 A1* | 11/2012 | Song | G06V 40/20 |
| | | | 382/199 |

(Continued)

FOREIGN PATENT DOCUMENTS

| JP | 2008-146583 A | 6/2008 |
|---|---|---|
| JP | 2010-237873 A | 10/2010 |

(Continued)

OTHER PUBLICATIONS

International Search Report for PCT Application No. PCT/JP2019/025276, mailed on Sep. 17, 2019.

(Continued)

*Primary Examiner* — Pinalben Patel
(74) *Attorney, Agent, or Firm* — Sughrue Mion, PLLC

(57) ABSTRACT

A person state detection apparatus (10) according to the present disclosure includes an acquisition unit (11) for acquiring a two-dimensional image obtained by capturing a person, a skeletal structure detection unit (12) for detecting a two-dimensional skeletal structure of the person based on the acquired two-dimensional image, an estimation unit (13) for estimating a height of the person standing upright in a two-dimensional image space based on the detected two-dimensional skeletal structure, and a state detection unit (14) for detecting the state of the person based on a height of an area where the person is present in the two-dimensional image.

20 Claims, 20 Drawing Sheets

(56) References Cited

U.S. PATENT DOCUMENTS

| | | | |
|---|---|---|---|
| 2015/0213653 A1* | 7/2015 | Kord | A63F 13/213 |
| | | | 345/420 |
| 2020/0285846 A1 | 9/2020 | Oami | |
| 2024/0193809 A1* | 6/2024 | Ostadabbas | G06V 40/103 |

FOREIGN PATENT DOCUMENTS

| | | |
|---|---|---|
| JP | 2012-120647 A | 6/2012 |
| JP | 2017-503225 A | 1/2017 |
| JP | 6529062 B | 6/2019 |
| WO | 2019/064375 A1 | 4/2019 |

OTHER PUBLICATIONS

Zhe Cao et al., "Realtime Multi-Person 2D Pose Estimation using Part Affinity Fields", The IEEE Conference on Computer Vision and Pattern Recognition (CVPR), 2017, pp. 7291-7299.
Indian Office Action for IN Application No. 202117060716 mailed on Jul. 4, 2022.

* cited by examiner

PERSON STATE DETECTION APPARATUS, PERSON STATE DETECTION METHOD, AND NON-TRANSITORY COMPUTER READABLE MEDIUM STORING PROGRAM

This application is a National Stage Entry of PCT/JP2019/025276 filed on Jun. 26, 2019, the contents of all of which are incorporated herein by reference, in their entirety.

TECHNICAL FIELD

The present disclosure relates to a person state detection apparatus, a person state detection method, and a non-transitory computer readable medium storing a program.

BACKGROUND ART

Recently, a technique in which a state of a person such as a posture and an action of the person is detected from an image captured by a monitoring camera has been used in a monitoring system and the like. As a technique related to detection of a posture of a person, Patent Literature 1 and 2 is known. Patent Literature 1 discloses a technique for recognizing a posture of a person from a temporal change of an image area of the person. Patent Literature 2 discloses a technique for determining a posture of a person from a height, a width, and a depth of a three-dimensional person area in a distance image. In addition, Non Patent Literature 1 is known as a technique related to skeleton estimation of a person.

CITATION LIST

Patent Literature

Patent Literature 1: Japanese Unexamined Patent Application Publication No. 2010-237873
Patent Literature 2: Japanese Unexamined Patent Application Publication No. 2008-146583

Non Patent Literature

Non Patent Literature 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, P. 7291-7299

SUMMARY OF INVENTION

Technical Problem

As described above, in Patent Literature 1, since the posture of the person is detected based on a change of the image area of the person, it is essential that the person in the image stand upright. Thus, it is not possible to accurately detect the posture of the person depending on the posture of the person.
Further, in Patent Literature 2, it is assumed that three-dimensional information of the distance image is acquired. For these reasons, there is a problem in the related art that it is difficult to accurately detect the state of the person from a two-dimensional image obtained by capturing the person.
In view of such a problem, it is an object of the present disclosure to provide a person state detection apparatus, a person state detection method, and a non-transitory computer readable medium storing a program capable of improving accuracy of detecting a state of a person.

Solution to Problem

A person state detection apparatus according to the present disclosure includes: acquisition means for acquiring a two-dimensional image obtained by capturing a person; skeletal structure detection means for detecting a two-dimensional skeletal structure of the person based on the acquired two-dimensional image; estimation means for estimating a height of the person standing upright in a two-dimensional image space based on the detected two-dimensional skeletal structure; and state detection means for detecting the state of the person based on the estimated height of the person standing upright and a height of an area where the person is present in the two-dimensional image.

A person state detection method according to the present disclosure includes: acquiring a two-dimensional image obtained by capturing a person; detecting a two-dimensional skeletal structure of the person based on the acquired two-dimensional image; estimating a height of the person standing upright in a two-dimensional image space based on the detected two-dimensional skeletal structure; and detecting the state of the person based on the estimated height of the person standing upright and a height of an area where the person is present in the two-dimensional image.

A person state detection program for causing a computer to execute processing of: acquiring a two-dimensional image obtained by capturing a person; detecting a two-dimensional skeletal structure of the person based on the acquired two-dimensional image; estimating a height of the person standing upright in a two-dimensional image space based on the detected two-dimensional skeletal structure; and detecting the state of the person based on the estimated height of the person standing upright and a height of an area where the person is present in the two-dimensional image.

Advantageous Effects of Invention

According to the present disclosure, it is possible to provide a person state detection apparatus, a person state detection method, and a non-transitory computer readable medium storing a program capable of improving accuracy of detecting a state of a person.

DESCRIPTION OF EMBODIMENTS

Example embodiments will be described below with reference to the drawings. In each drawing, the same elements are denoted by the same reference signs, and the repeated description is omitted if necessary.

Study Leading to Example Embodiments

Recently, image recognition technology utilizing machine learning has been applied to various systems. As an example, a monitoring system for performing monitoring using images captured by a monitoring camera will be discussed.

Figure 1:
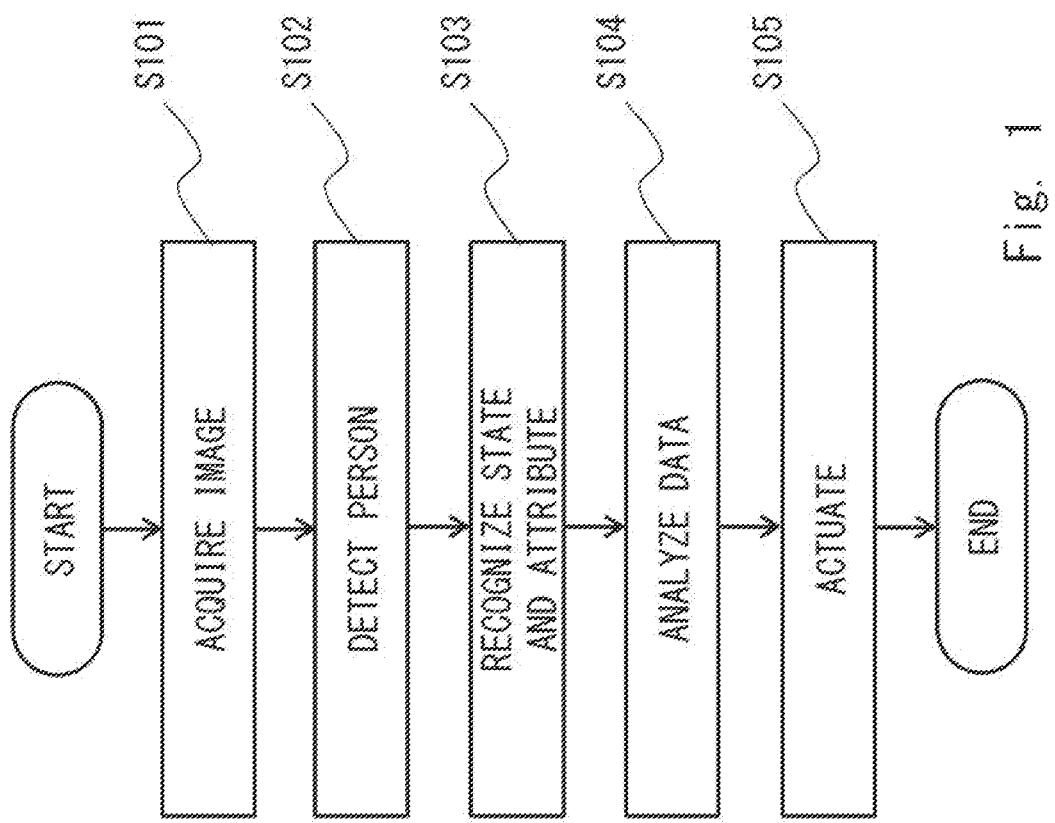
FIG. 1 is a flowchart showing a monitoring method according to related art.

FIG. 1 shows a monitoring method performed by a monitoring system according to related art. As shown in FIG. 1, the monitoring system acquires an image from the monitoring camera (S101), detects a person from the acquired image (S102), and performs state recognition and attribute recognition of the person (S103). For example, a posture and an action such as a behavior and a movement line, of the person are recognized as the states of the person, and age, gender, height, etc. of the person are recognized as the attributes of the person. Further, the monitoring system performs data analysis on the recognized states and attributes of the person (S104), and actuation such as processing based on an analysis result or the like is performed (S105). For example, the monitoring system displays an alert from the recognized posture and actions, etc., and the attribute such as the recognized height of the person is monitored.

As in the state recognition in this example, there is a growing demand particularly in a monitoring system for detecting the posture and action of a person, which are different from usual posture and action, from videos captured by the monitoring camera. The posture and action include, for example, crouching down, lying down, and falling.

As a result of a study on a method for detecting a state such as a posture and an action of a person from an image, they found that it is difficult to easily detect the state by the related technique, and that it is not always possible to detect the state with high accuracy. With recent development of deep learning, it is possible to detect the posture by collecting a large number of videos obtained by capturing a posture and the like of an object to be detected and then learning them. However, it is difficult and costly to collect this learning data. Furthermore, for example, if a part of a person's body is hidden, the state of the person may not be detected.

Therefore, the inventors studied a method using a skeleton estimation technique by means of machine learning for detecting a state of a person. For example, in a skeleton estimation technique according to related art such as Open-Pose disclosed in Non Patent Literature 1, a skeleton of a person is estimated by learning various patterns of annotated image data. In the following example embodiments, a state of a person can be easily detected and an accuracy of the detection can be improved by utilizing such a skeleton estimation technique.

The skeletal structure estimated by the skeleton estimation technique such as OpenPose is composed of "key points" which are characteristic points such as joints, and "bones", i.e., bone links" indicating links between the key points. Therefore, in the following example embodiments, the skeletal structure is described using the terms "key point" and "bone", but unless otherwise specified, the "key point" corresponds to the "joint" of a person, and a "bone" corresponds to the "bone" of the person.

Overview of Example Embodiments

Figure 2:
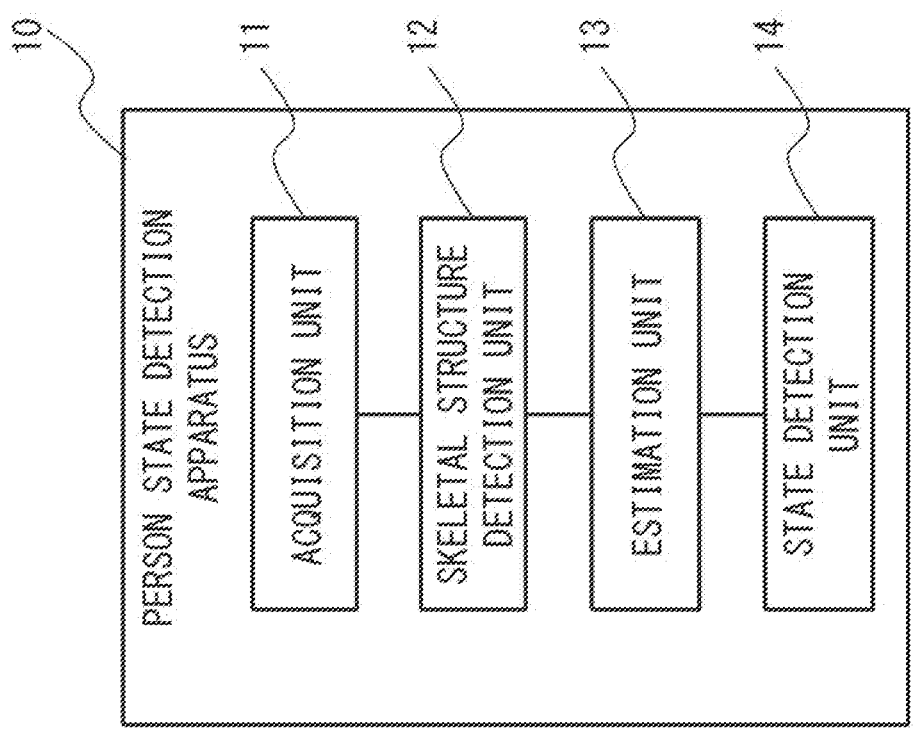
FIG. 2 is a block diagram showing an overview of a person state detection apparatus according to example embodiments.

FIG. 2 shows an overview of a person state detection apparatus 10 according to the example embodiment. As shown in FIG. 2, the person state detection apparatus 10 includes an acquisition unit 11, a skeletal structure detection unit 12, an estimation unit 13, and a state detection unit 14.

The acquisition unit 11 acquires a two-dimensional image obtained by capturing an animal such as a person. The skeletal structure detection unit 12 detects a two-dimensional skeletal structure of the person based on the two-dimensional image acquired by the acquisition unit 11. The estimation unit 13 estimates the height of the person standing upright in a two-dimensional image space based on the two-dimensional skeletal structure detected by the skeletal structure detection unit 12. The state detection unit 14 detects a state such as a posture and an action of the person based on the height when the person stands upright estimated by the estimation unit 13 and a height of an area where the person is present in the two-dimensional image.

Thus, in the example embodiments, a two-dimensional skeletal structure of a person is detected from a two-dimensional image, and a state of the person is detected from a height of the person in the two-dimensional image space estimated based on this two-dimensional skeletal structure, which enables easy detection of the state of the person, and accurate detection of the state of the person regardless of the posture of the person.

First Example Embodiment

Figure 3:
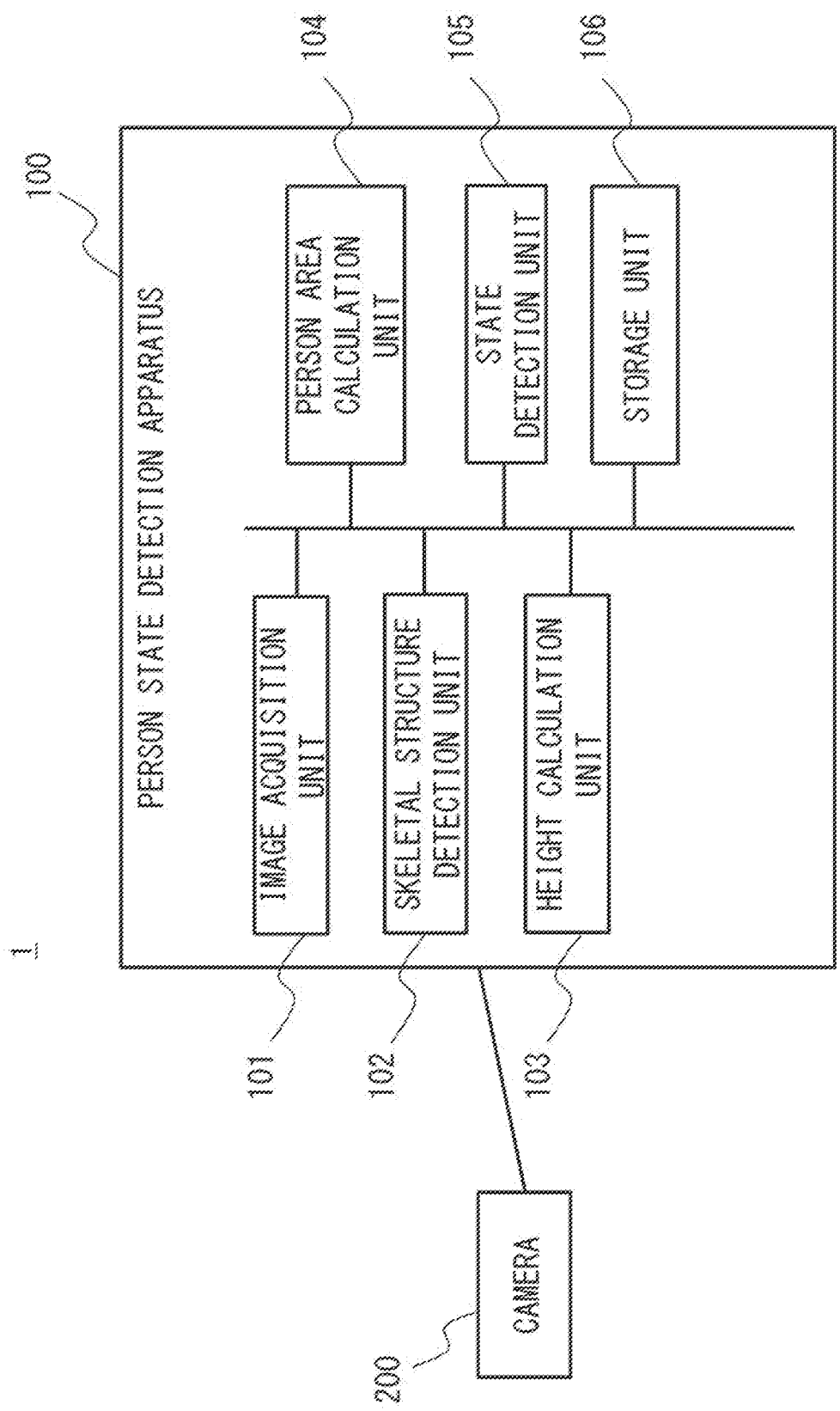
FIG. 3 is a block diagram showing a configuration of a person state detection apparatus according to a first example embodiment.

A first example embodiment will be described below with reference to the drawings. FIG. 3 shows a configuration of the person state detection apparatus 100 according to this example embodiment. The person state detection apparatus 100 and a camera 200 constitute a person state detection system 1. For example, the person state detection apparatus 100 and the person state detection system 1 are applied to a monitoring method in a monitoring system as shown in FIG. 1, and a state such as a posture and an action of a person is detected, an alarm corresponding to this detection is displayed, and other processing is performed. The camera 200 may be included inside the person state detection apparatus 100.

As shown in FIG. 3, the person state detection apparatus 100 includes an image acquisition unit 101, a skeletal structure detection unit 102, a height calculation unit 103, a person area calculation unit 104, a state detection unit 105, and a storage unit 106. A configuration of each unit, i.e., each block, is an example, and may be composed of other units, as long as the method or an operation described later is possible. Further, the person state detection apparatus 100 is implemented by, for example, a computer apparatus such as a personal computer or a server for executing a program, and instead may be implemented by one apparatus or a plurality of apparatuses on a network.

The storage unit 106 stores information and data necessary for the operation and processing of the person state detection apparatus 100. For example, the storage unit 106 may be a non-volatile memory such as a flash memory or a hard disk apparatus. The storage unit 106 stores images acquired by the image acquisition unit 101, images processed by the skeletal structure detection unit 102, data for machine learning, and so on. The storage unit 106 may be an external storage apparatus or an external storage apparatus on the network. That is, the person state detection apparatus 100 may acquire necessary images, data for machine learning, and so on from the external storage apparatus.

The image acquisition unit 101 acquires a two-dimensional image captured by the camera 200 from the camera 200 which is connected to the person state detection apparatus 100 in a communicable manner. The camera 200 is an imaging unit such as a monitoring camera for capturing a person, and the image acquisition unit 101 acquires, from the camera 200, an image obtained by capturing the person.

The skeletal structure detection unit 102 detects a two-dimensional skeletal structure of the person in the image based on the acquired two-dimensional image. The skeletal structure detection unit 102 detects the skeletal structure of the person based on the characteristics such as joints of the person to be recognized using a skeleton estimation technique by means of machine learning. The skeletal structure detection unit 102 uses, for example, the skeleton estimation technique such as OpenPose of Non Patent Literature 1.

The height calculation unit, i.e., a height estimation unit, 103 calculates and estimates the height, which is referred to as a height pixel count, of the person standing upright in the two-dimensional image based on the detected two-dimensional skeletal structure. The height pixel count can be said to be the height of the person in the two-dimensional image, i.e., the length of the whole body of the person in a two-dimensional image space. The height calculation unit 103 obtains the height pixel count, i.e., a pixel count, from the length, which is the length in the two-dimensional image space, of each bone of the detected skeletal structure. In this example embodiment, the height pixel count is obtained by summing up the lengths of respective bones from the head to the foot of the skeletal structure. When the skeletal structure detection unit 102, by means of the skeleton estimation technique, does not output the top of the head and the foot, the height pixel count may be corrected by multiplying the height pixel count by a constant as necessary.

The person area calculation unit 104 calculates the height of the person, which is referred to as a person area height, in the image based on the acquired two-dimensional image. The person area calculation unit 104 extracts the person area in an image and calculates the height, i.e., a pixel count, of the person area in a vertical direction. For example, when the person is crouching down, the pixel count from the top of the head to the tip of the foot is calculated.

The state detection unit 105 detects the state of the person based on the calculated height pixel count and the height of the person area. In this example, a posture such as standing upright, crouching down, or lying down is detected as the state of the person. The state detection unit 105 may detect the action such as falling down from a temporal change of the posture as the state of the person. The state detection unit 105 obtains a ratio of the height pixel count to the height of the person area, and detects the posture of the person from the ratio.

Figure 4:
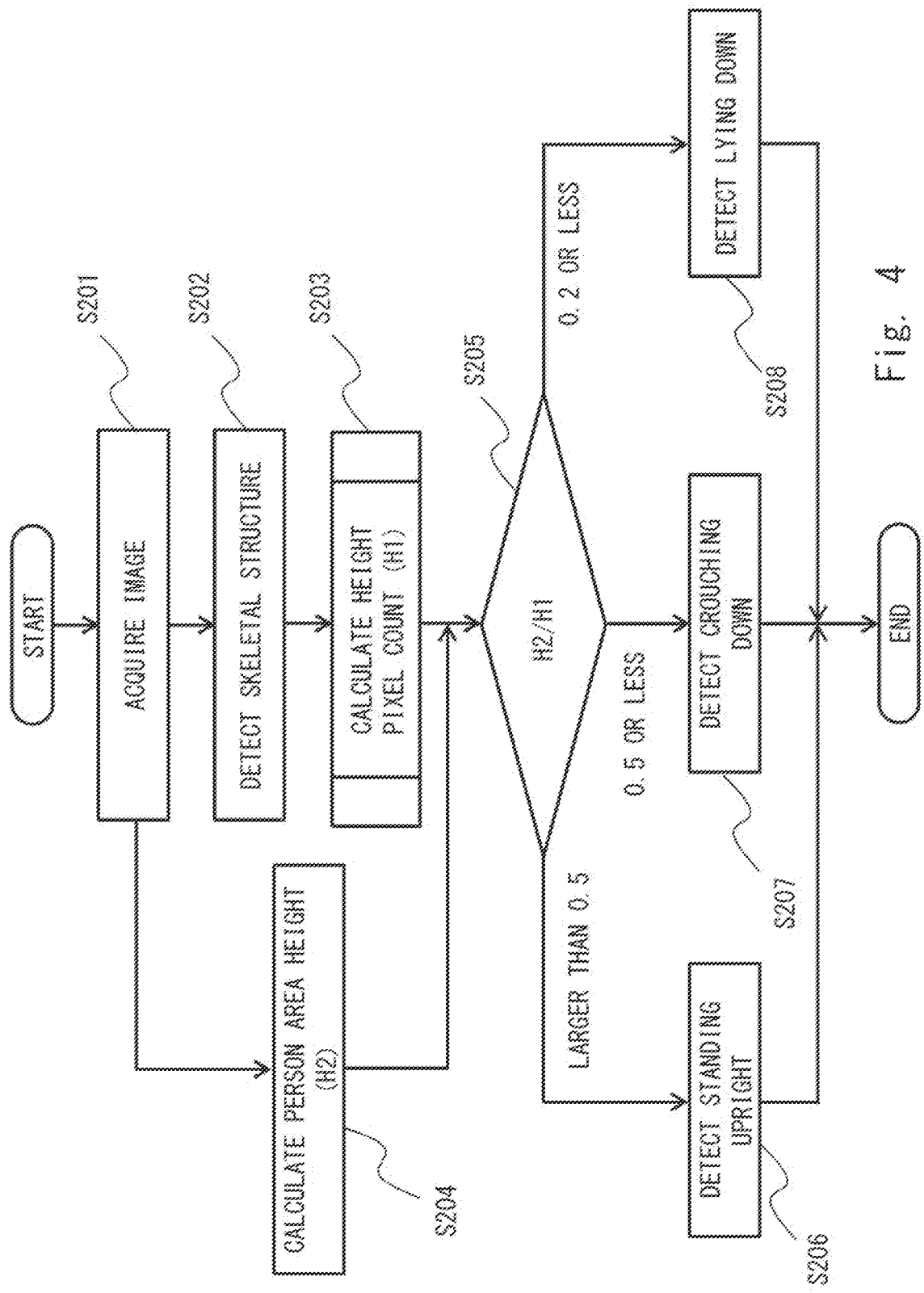
FIG. 4 is a flowchart showing a person state detection method according to the first example embodiment.
Figure 5:
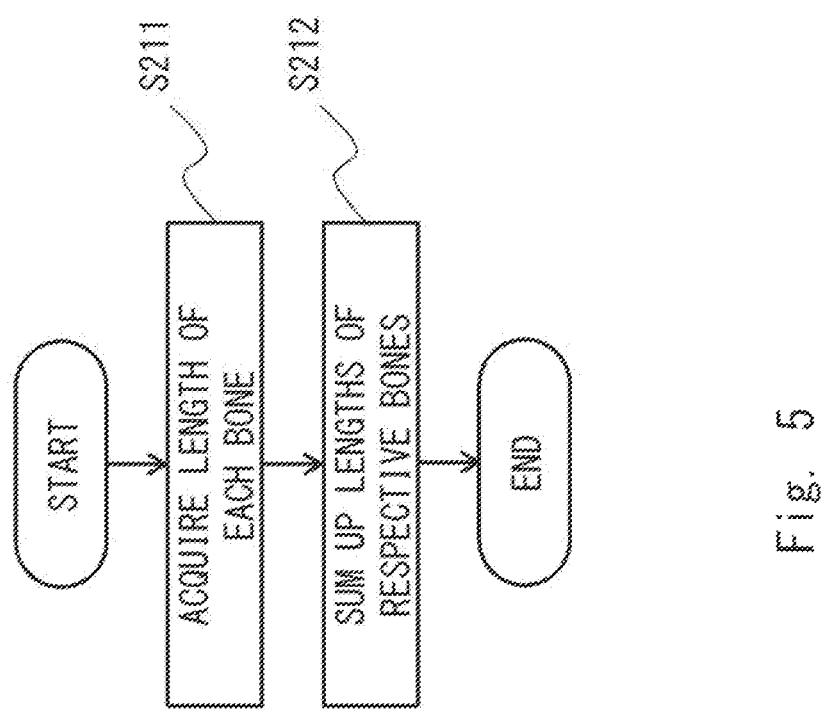
FIG. 5 is a flowchart showing a height pixel count calculation method according to the first example embodiment.

FIGS. 4 and 5 show an operation of the person state detection apparatus 100 according to this embodiment. FIG. 4 shows a flow from image acquisition to state detection in the person state detection apparatus 100, and FIG. 5 shows a flow of height pixel count calculation processing (S203) in FIG. 4.

As shown in FIG. 4, the person state detection apparatus 100 acquires an image from the camera 200 (S201). The image acquisition unit 101 acquires the image obtained by capturing the person for detecting the skeletal structure and the person area.

Figure 6:
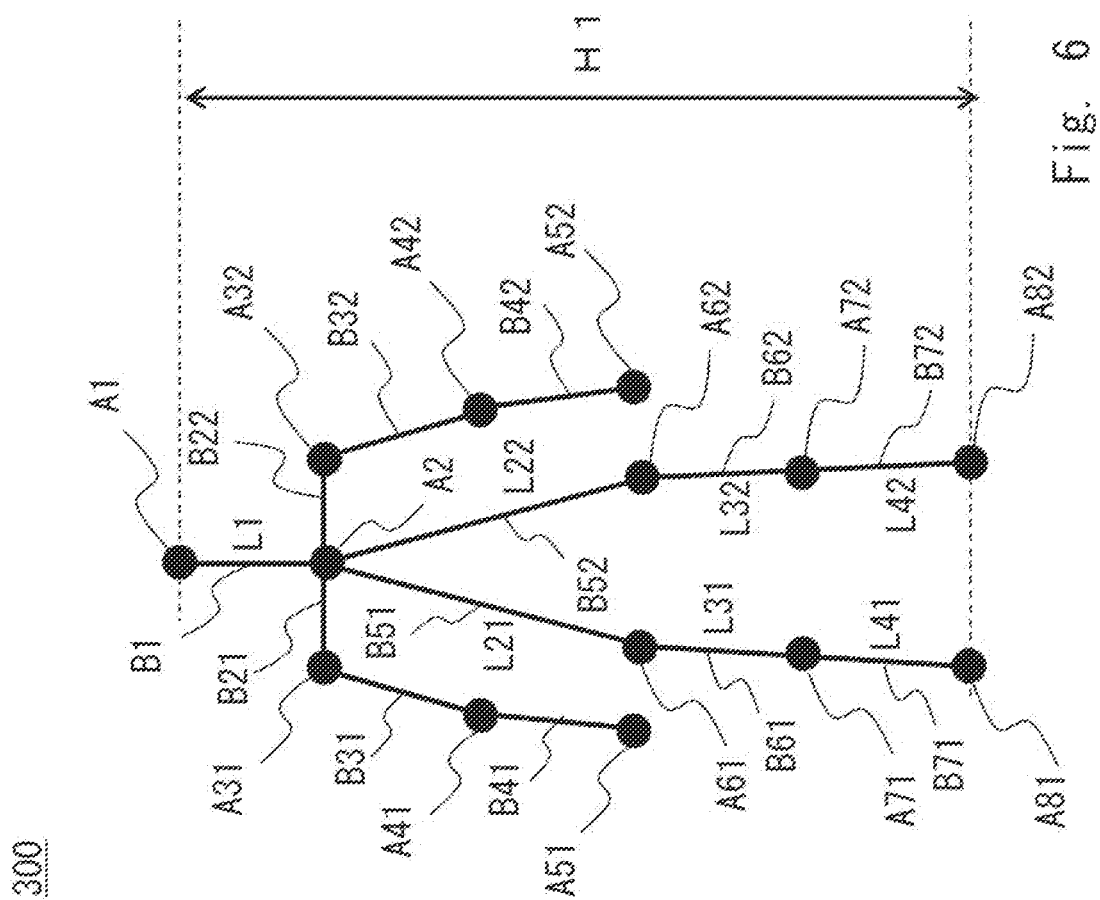
FIG. 6 shows a human body model according to the first example embodiment.
Figure 7:
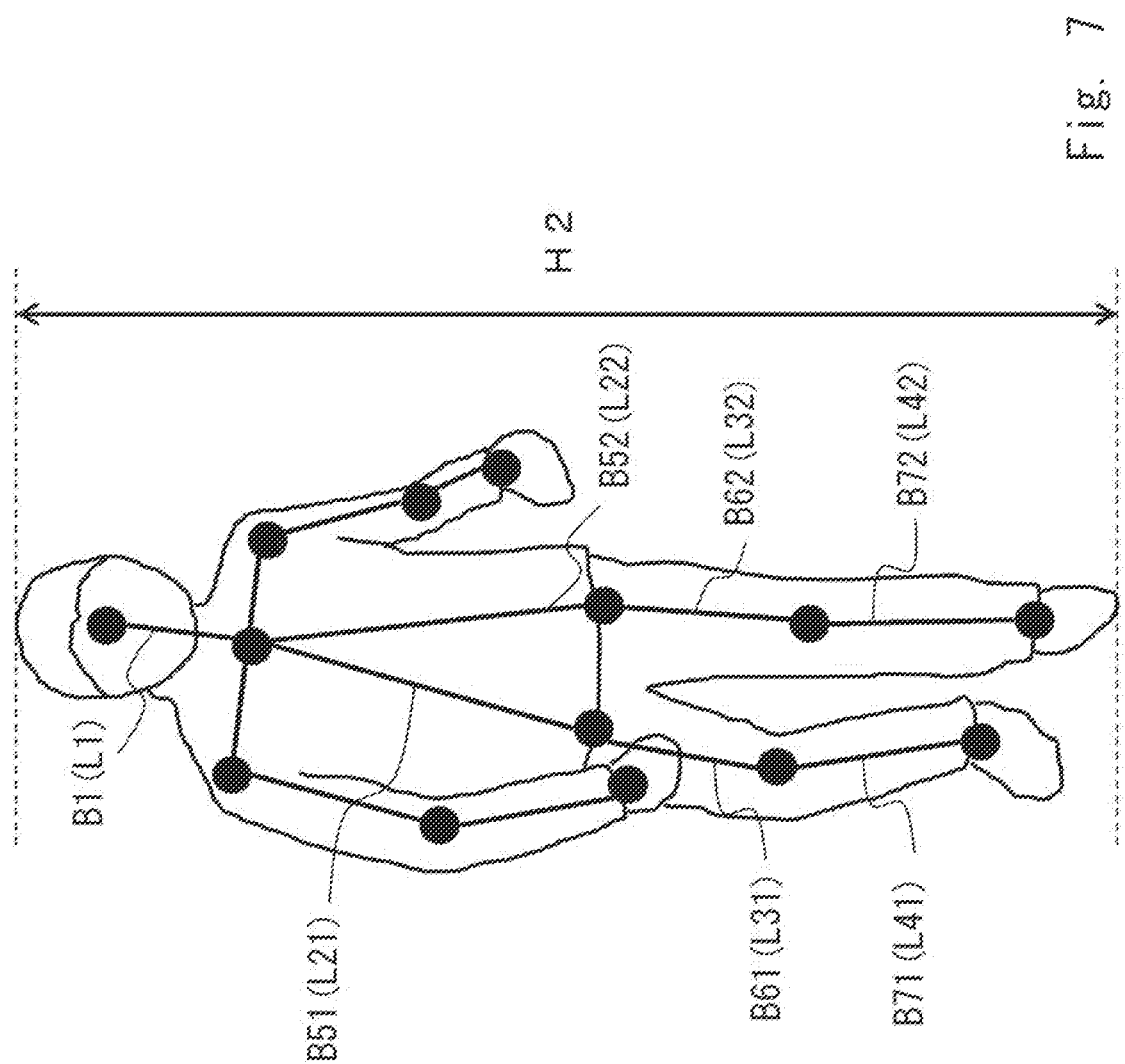
FIG. 7 shows an example of detection of a skeletal structure according to the first example embodiment.
Figure 8:
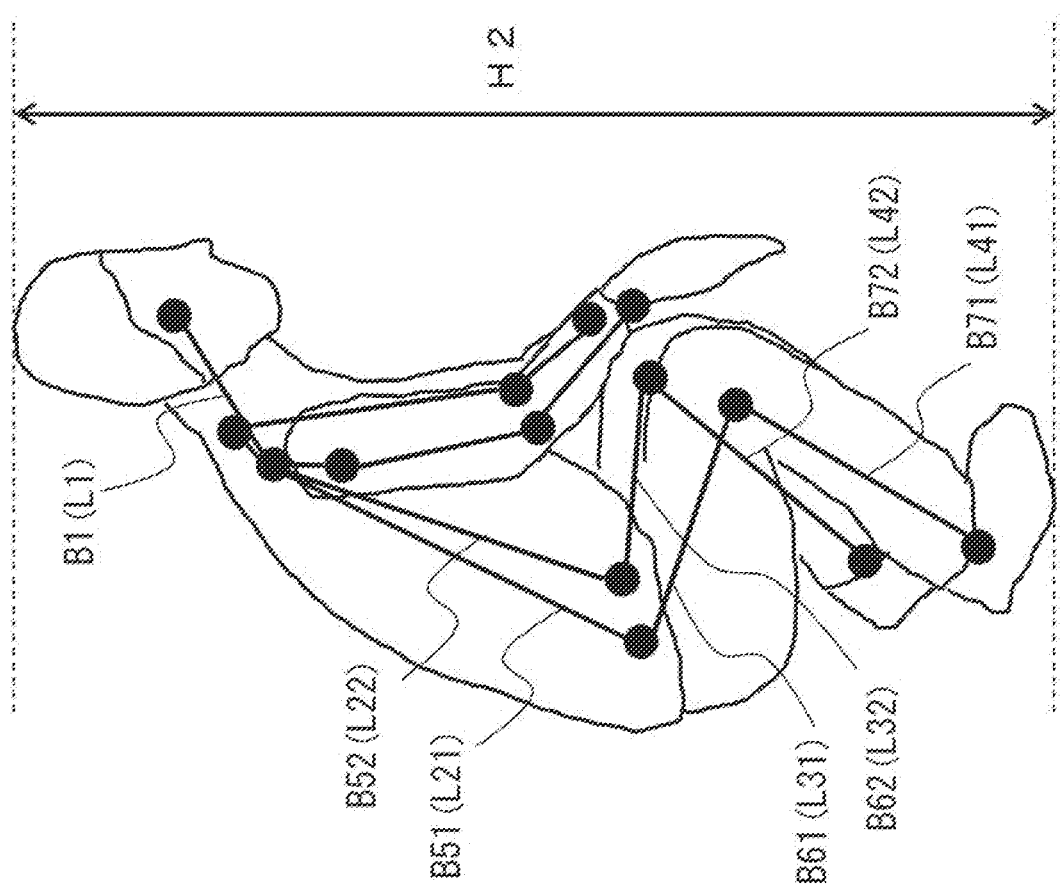
FIG. 8 shows an example of detection of the skeletal structure according to the first example embodiment.
Figure 9:
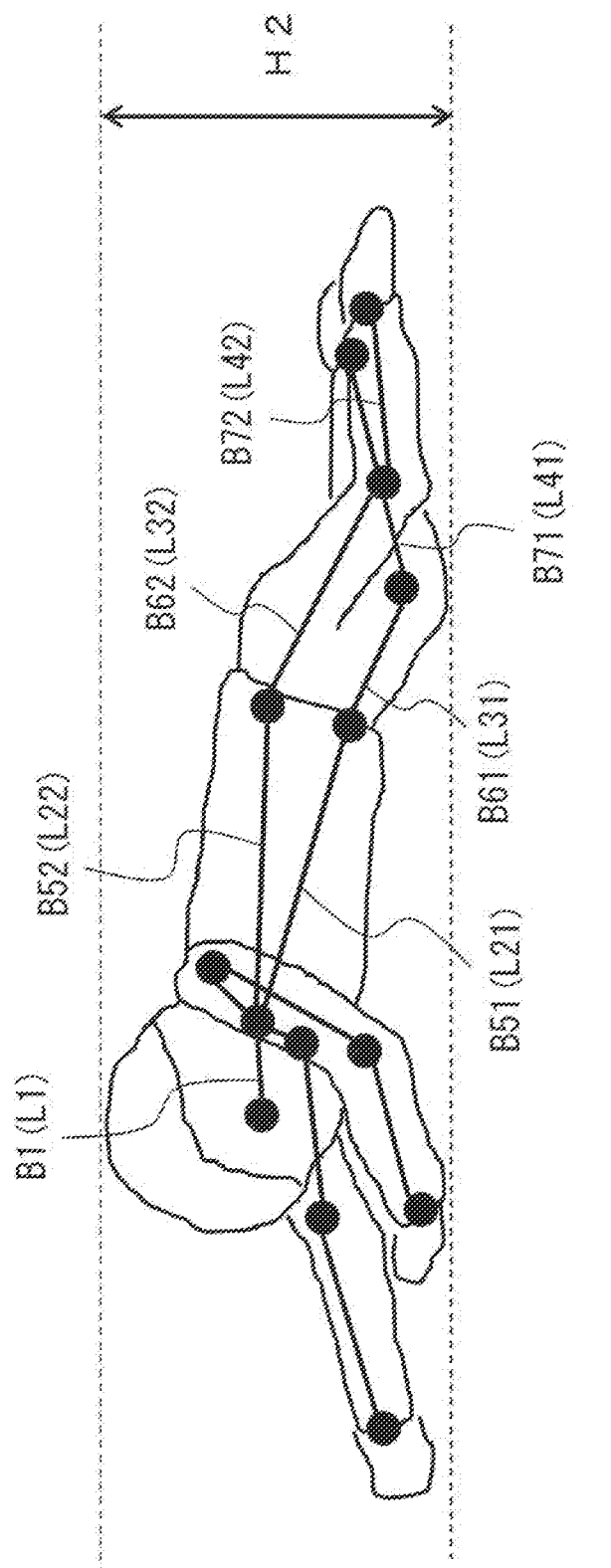
FIG. 9 shows an example of detection of the skeletal structure according to the first example embodiment.

Next, the person state detection apparatus 100 detects the skeletal structure of the person based on the acquired image of the person (S202). FIG. 6 shows the skeletal structure of a human body model 300 detected at this time. FIGS. 7 to 9 show examples of detection of the skeletal structure. The skeletal structure detection unit 102 detects the skeletal structure of the human body model 300, which is a two-dimensional skeleton model, shown in FIG. 6 from the two-dimensional image by the skeleton estimation technique such as OpenPose. The human body model 300 is a two-dimensional model composed of key points such as joints of a person and bones connecting the key points.

The skeletal structure detection unit 102 extracts, for example, characteristic points that can be the key points from the image, and detects each key point of the person by referring to information obtained by machine learning the image of the key point. In the example of FIG. 6, as the key points of a person, a head A1, a neck A2, a right shoulder A31, a left shoulder A32, a right elbow A41, a left elbow A42, a right hand A51, a left hand A52, a right hip A61, a left hip A62, a right knee A71, a left knee A72, a right foot A81, and a left foot A82 are detected. Further, as the bones of the person connecting these key points, a bone B1 connecting the head A1 to the neck A2, bones B21 and B22 respectively connecting the neck A2 to the right shoulder A31 and the neck A2 to the left shoulder A32, bones B31 and B32 respectively connecting the right shoulder A31 to the right elbow A41 and the left shoulder A32 to the left elbow A42, bones B41 and B42 respectively connecting the right elbow A41 to the right hand A51 and the left elbow A42 to the left hand A52, bones B51 and B52 respectively connecting the neck A2 to the right hip A61 and the neck A2 to the left hip A62, bones B61 and B62 respectively connecting the right hip A61 to the right knee A71 and the left hip A62 to the left knee A72, bones B71 and B72 respectively connecting the right knee A71 to the right foot A81 and the left knee A72 to the left foot A82 are detected.

FIG. 7 shows an example in which a person standing upright is detected. In FIG. 7, an image of an upright person is captured from the front, the bones B1, B51, and B52, the bones B61 and B62, and the bones B71 and B72 viewed from the front are detected with no overlapping between them, and the bones B61 and B71 of the right foot are bent slightly more than bones B62 and B72 of the left foot. FIG. 8 shows an example in which a person crouching down is detected. In FIG. 8, an image of the person crouching down is captured from the right side, the bone B1, the bones B51 and B52, the bones B61 and B62, and the bones B71 and B72 viewed from the right side are detected, and the bones B61 and B71 of the right foot and the bones B62 and B72 of the left foot are largely bent and overlapped. FIG. 9 shows an example in which a person lying down is detected. In FIG. 9, an image of the person lying down is captured from diagonally forward left, and the bone B1, the bones B51 and B52, the bones B61 and B62, and the bones B71 and B72 viewed from diagonally forward left are detected, and the bones B61 and B71 of the right foot and the bones B62 and B72 of the left foot are bent and overlapped.

Next, the person state detection apparatus 100 performs the height pixel count calculation processing (H1) based on the detected skeletal structure (S203). In the height pixel count calculation processing, as shown in FIG. 5, the height calculation unit 103 acquires the lengths of the respective bones (S211), and sums up the acquired lengths of the respective bones (S212). The height calculation unit 103 acquires the lengths of the bones from the head part to the foot part of the person in the two-dimensional image to obtain the height pixel count. That is, from among the bones shown in FIG. 6, the respective lengths, i.e., the pixel count, of the bone B1 (length L1), the bone B51 (length L21), the bone B61 (length L31) and the bone B71 (length L41), or the bone B1 (length L1), the bone B52 (length L22), the bone B62 (length L32), and the bone B72 (length L42) are acquired from the image in which the skeletal structure is detected. The length of each bone can be obtained from the coordinates of each key point in the two-dimensional image. The sum of these values, L1+L21+L31+L41 or L1+L22+L32+L42, multiplied by a correction constant, is calculated as the height pixel count (H1). When both values can be calculated, for example, the larger value is used as the height pixel count. That is, the length of each bone in the image becomes the longest when the image is captured from the front, and is displayed shorter when the bone is tilted in a depth direction with respect to the camera. Therefore, a longer bone is more likely to be captured from the front, and is considered to be closer to an actual value. For this reason, it is preferable that the larger value be selected.

In the example of FIG. 7, the bone B1, the bones B51 and B52, the bones B61 and B62, and the bones B71 and B72 are detected with no overlapping between them. The sums of these bones L1+L21+L31+L41 and L1+L22+L32+L42 are obtained, and for example, a value calculated by multiplying the sum of L1+L22+L32+L42 for the left foot side, which indicates a longer length of the detected bones, by the correction constant is used as the height pixel count.

In the example of FIG. 8, the bone B1, the bones B51 and B52, the bones B61 and B62, and the bones B71 and B72 are detected, and the bones B61 and B71 of the right foot overlap the bones B62 and B72 of the left foot. The sums of these bones L1+L21+L31+L41 and L1+L22+L32+L42 are obtained, and for example, a value calculated by multiplying the sum of L1+L21+L31+L41 for the right foot side, which indicates a longer length of the detected bones, by the correction constant is used as the height pixel count.

In the example of FIG. 9, the bone B1, the bones B51 and B52, the bones B61 and B62, and the bones B71 and B72 are detected, and the bones B61 and B71 of the right foot overlap the bones B62 and B72 of the left foot. The sums of these bones L1+L21+L31+L41 and L1+L22+L32+L42 are obtained, and for example, a value calculated by multiplying the sum of L1+L22+L32+L42 for the left foot side, which indicates a longer length of the detected bones, by the correction constant is used as the height pixel count.

In the meantime, as shown in FIG. 4, the person state detection apparatus 100 calculates a person area height (H2) in the image based on the image acquired from the camera 200 (S204). The person area calculation unit 104 detects an upper end and a lower end of the person area in the image in a height direction, and calculates the height of the person area, which is the pixel count. The height of the person area can be obtained from coordinates of end parts of the person area, which are the upper and lower ends of the person area in the height direction, in the image.

In FIG. 7, the whole body of the person standing upright is captured from the front. In this example, a length from the upper end of the head part, which is the top of the head, of the person to the lower end of the foot part, which is a tip of the left foot, of the person is defined as the person area height (H2). In FIG. 8, the whole body of the person crouching down is captured from the right side. In this example, a length from the upper end of the head part, which is the top of the head, of the person to the lower end of the foot part, which is a base of the right toe, of the person is defined as the person area height (H2). In the drawing, the whole body of the person lying down is captured from the left forward. In this example, a length from the upper end of the head part, which is the top of the head, of the person to the lower end of the foot part, which is a right knee, of the person is defined as the person area height (H2).

Next, the person state detection apparatus 100 detects the state of the person based on the height pixel count (H1) and the person area height (H2) (S205 to S208). The state detection unit 105 obtains a ratio of the height pixel count (H1) to the person area height (H2), namely, H2/H1 (S205). In this example, by comparing H2/H1 with a threshold (0.5=1/2 and 0.2=1/5), a standing state, a crouching-down state, or a lying state is detected. Note that the threshold is an example and is not limited to this. Further, a state in which both hands are raised, for example when if H2/H1=1 or more, or a state in which the person is sitting on a chair, for example when H2/H1=0.5 to 0.7, may be detected by other thresholds.

When H2/H1 is larger than 0.5, the state detection unit 105 detects that the person is standing upright (S206). For example, in FIG. 7, if H1=L1+L22+L32+L42=100 pixels and H2=110 pixels from the upper end of the head to the lower end of the foot, H2/H1=110/100=1.1, it is determined that the person is standing upright.

When H2/H1 is 0.5 or less and greater than 0.2, the state detection unit 105 detects that the person is crouching down (S207). For example, in FIG. 8, if H1=L1+L21+L31+L41=110 pixels and H2=50 pixels from the upper end of the head to the lower end of the foot, H2/H1=50/110=0.45, and thus it is determined that the person is crouching down.

Further, for example, when H2/H1 is 0.2 or less, the state detection unit 105 detects that the person is lying down (S208). For example, in FIG. 9, if H1=L1+L22+L32+L42=110 pixels and H2=20 pixels from the upper end of the head to the lower end of the foot, H2/H1=20/110=0.18, and thus it is determined that the person is lying down.

As described above, in this example embodiment, the skeletal structure of the person is detected from the two-dimensional image, and the state of the person is detected based on the ratio of the height pixel count, i.e., the height of the person standing upright in the two-dimensional image space, obtained from the detected skeletal structure to the height of the person area in the image. Thus, the state of the person can be easily detected, because only the ratio of the height is required without using complicated calculation or machine learning. For example, by detecting the skeletal structure using the skeleton estimation technique, a state of a person can be detected without collecting learning data. Further, since information about the skeletal structure of the person is used, the state of the person can be detected regardless of the posture of the person.

Furthermore, in this example embodiment, the height pixel count is obtained by summing up the lengths of the bones of the detected skeletal structure as the height to be estimated. Since the height can be obtained by summing up the lengths of the bones from the head to the foot, the height can be estimated by a simple method and the state of the person can be detected. In addition, since it is sufficient to detect at least the skeleton from the head to the foot by the skeleton estimation technique by means of machine learning, the height can be estimated with high accuracy even when the whole body of the person does not necessarily appear in the image such as when the person is crouching down to thereby detect the state of the person.

Second Example Embodiment

Next, a second example embodiment will be described. In this example embodiment, in the height pixel count calculation processing according to the first example embodiment, the height pixel count is calculated using a human body model showing a relationship between a length of each bone and a length of a whole body, i.e., a height in the two-dimensional image space. The processing other than the height pixel count calculation processing is the same as that of the first example embodiment.

Figure 10:
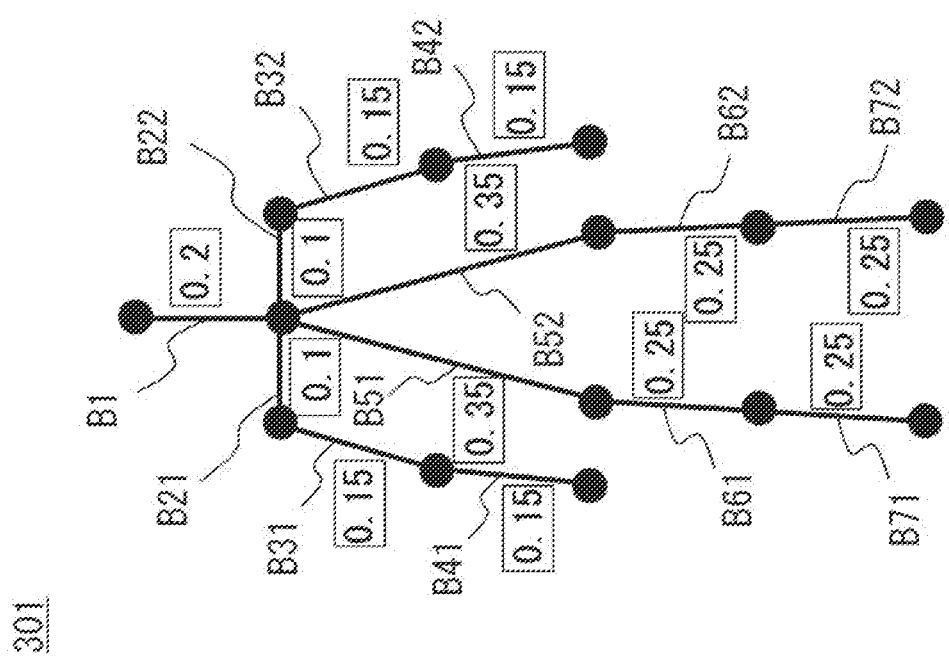
FIG. 10 shows a human body model according to a second example embodiment.

FIG. 10 shows a human body model 301, i.e., a two-dimensional skeleton model, showing the relationship between the length of each bone in the two-dimensional image space and the length of the whole body in the two-dimensional image space used in this example embodiment. As shown in FIG. 10, the relationship between the length of each bone of an average person and the length of the whole body, which is a ratio of the length of each bone to the length of the whole body, is associated with each bone of the human body model 301. For example, the length of the bone B1 of the head is the total length×0.2 (20%), the length of the bone B41 of the right hand is the total length×0.15 (15%), and the length of the bone B71 of the right foot is the total length×0.25 (25%). By storing such information of the human body model 301 in the storage unit 106, the average length of the whole body can be obtained from the length of each bone. In addition to a human body model of an average person, a human body model may be prepared for each attribute of the person such as age, gender, nationality, etc. By doing so, the length, namely, the height, of the whole body can be appropriately obtained according to the attribute of the person.

Figure 11:
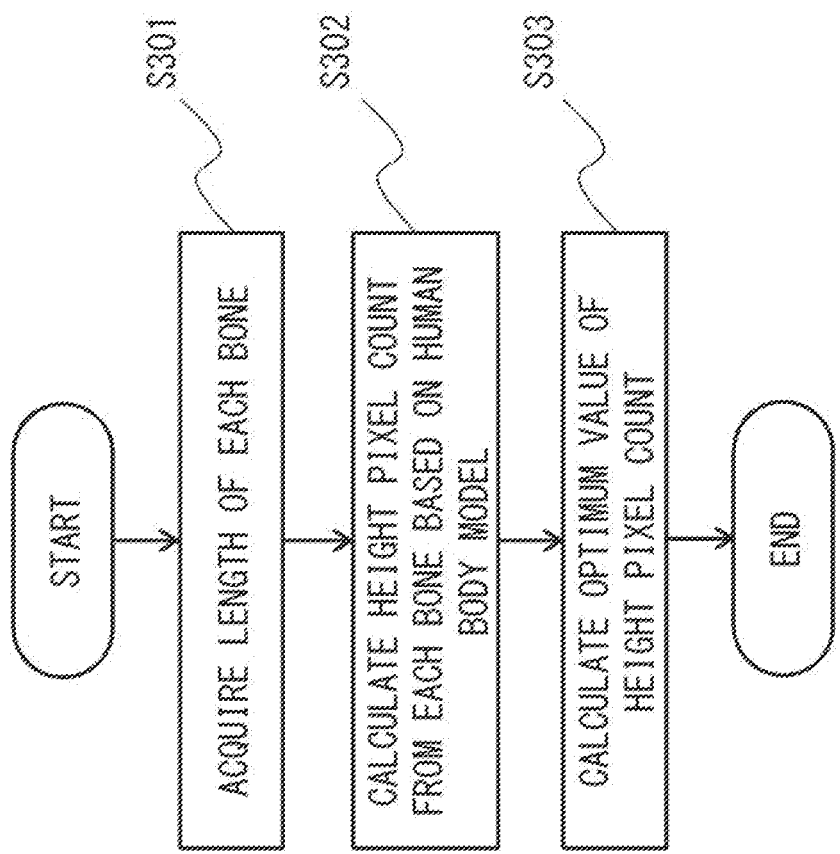
FIG. 11 is a flowchart showing a height pixel count calculation method according to the second example embodiment.
Figure 12:
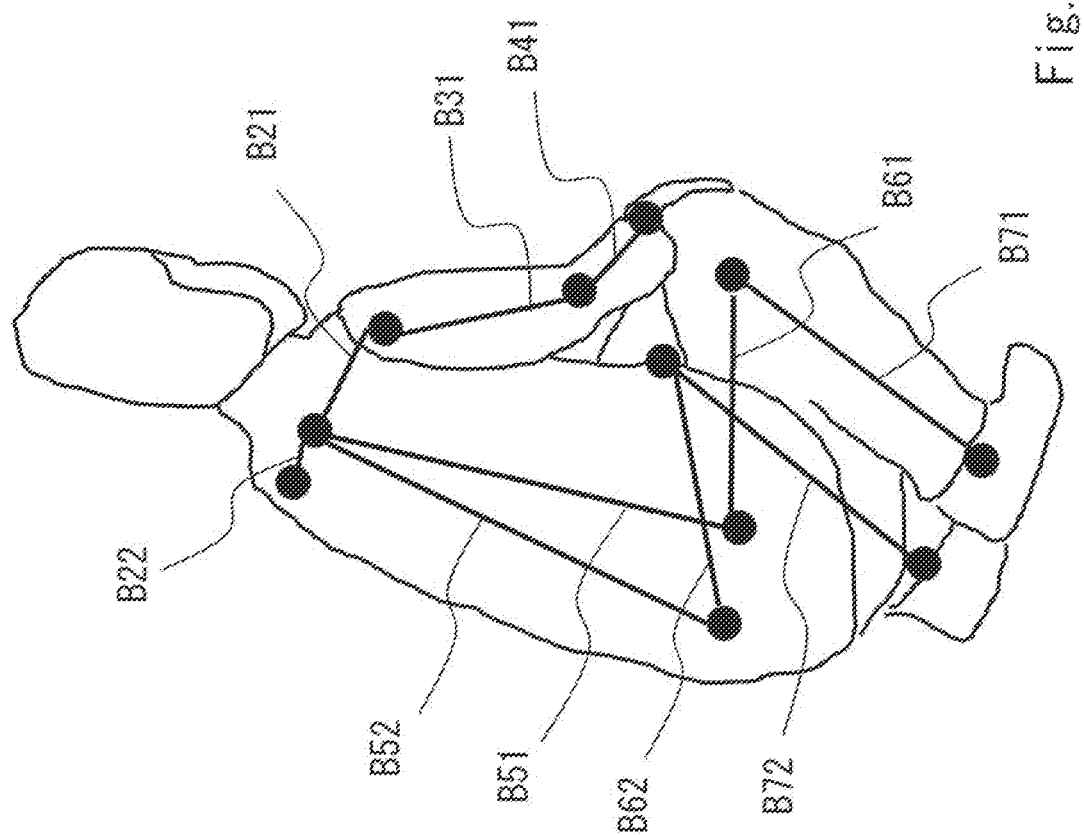
FIG. 12 shows an example of detection of the skeletal structure according to the second example embodiment.

FIG. 11 shows processing for calculating the height pixel count according to this example embodiment, and shows a flow of the height pixel count calculation processing (S203) shown in FIG. 4 according to the first example embodiment. In the height pixel count calculation processing according to this example embodiment, as shown in FIG. 11, the height calculation unit 103 acquires the length of each bone (S301). In the skeletal structure detected as in the first example embodiment, the height calculation unit 103 acquires the lengths of all bones, which are the lengths of the bones in the two-dimensional image space. FIG. 12 shows an example in which the skeletal structure is detected by capturing an image of a person crouching down from diagonally backward right. In this example, the bone of the head and the bones of the left arm and the left hand cannot be detected, because the face and the left side of the person do not appear in the image. Therefore, the lengths of the detected bones B21, B22, B31, B41, B51, B52, B61, B62, B71, and B72 are acquired.

Next, the height calculation unit 103 calculates the height pixel count from the length of each bone based on the human body model (S302). The height calculation unit 103 obtains the height pixel count from the length of each bone with reference to the human body model 301 showing the relationship between each bone and the length of the whole body as shown in FIG. 10. For example, since the length of the bone B41 of the right hand is the length of the whole body×0.15, the height pixel count based on the bone B41 is obtained by calculating the length of the bone B41/0.15. Further, since the length of the bone B71 of the right foot is the length of the whole body×0.25, the height pixel count based on the bone B71 is obtained by calculating the length of the bone B71/0.25.

The human body model to be referred to here is, for example, a human body model of an average person, but the human body model may be selected according to the attributes of the person such as age, gender, nationality, etc. For example, when a face of a person appears in the captured image, an attribute of the person is identified based on the face, and a human body model corresponding to the identified attribute is referred to. By referring to the information obtained by machine learning the face for each attribute, the attribute of the person can be recognized from the characteristics of the face of the image. When the attribute of the person cannot be identified from the image, a human body model of an average person may be used.

Furthermore, the height pixel count calculated from the length of the bone may be corrected by the camera parameters. The camera parameters are imaging parameters of the image. For example, the camera parameters include a posture, a position, an imaging angle, a focal length, and the like of the camera 200. An image of an object whose length is known in advance is captured by the camera 200, and then the camera parameters can be obtained from the image. For example, when a camera placed at a high position captures a person so as to look down on him/her, a horizontal length of a bone or the like of the shoulder width of the two-dimensional skeletal structure is not affected by a depression angle of the camera. However, a vertical length of bones or the like of a neck to a waist decreases as the depression angle of the camera increases. Thus, the height pixel count calculated from the horizontal length of the bone or the like of the shoulder width tends to be larger than the actual value. By utilizing the camera parameters, it is possible to know the angle at which the person is looked down by the camera, and information about the depression angle can be used to correct the two-dimensional skeletal structure as if the person is captured from the front. In this manner, the height pixel count can be calculated more accurately.

Figure 13:
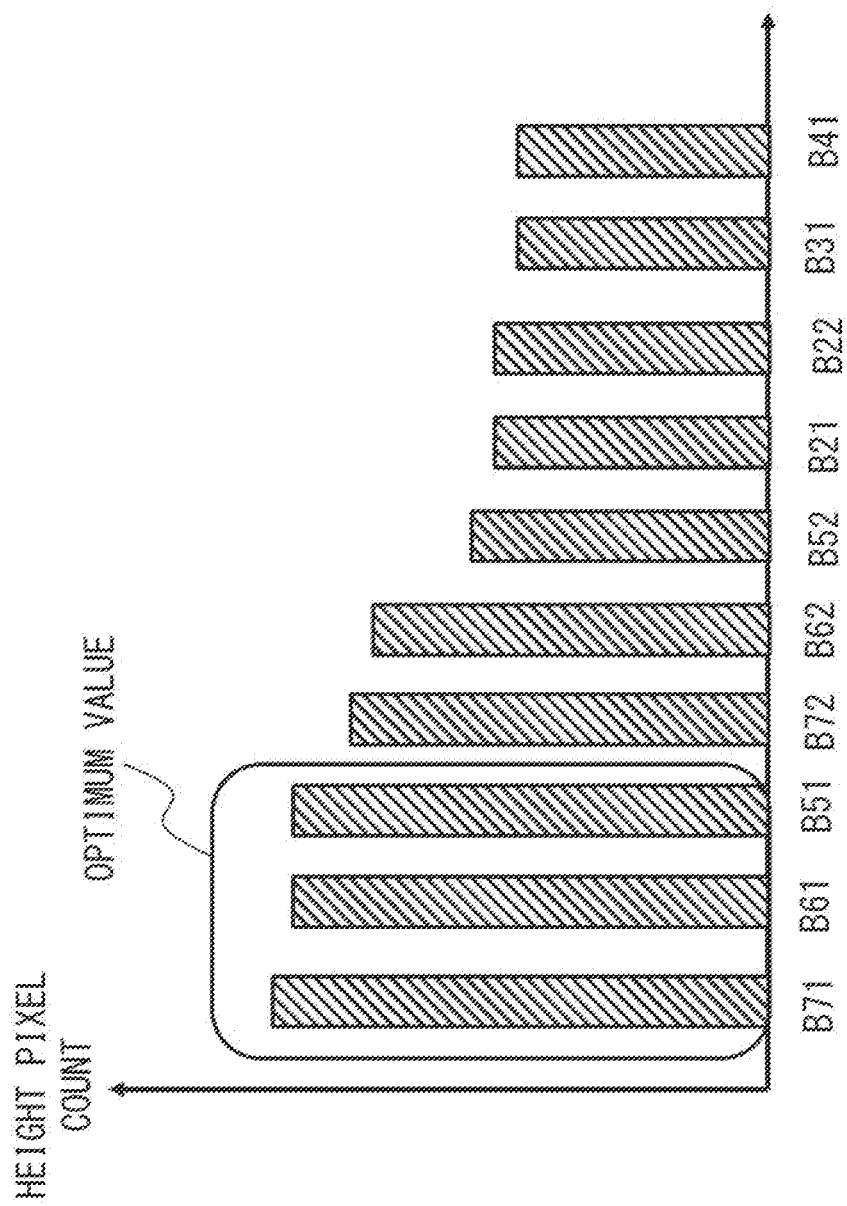
FIG. 13 is a histogram for explaining a height pixel count calculation method according to the second example embodiment.

Next, the height calculation unit 103 calculates an optimum value of the height pixel count (S303). The height calculation unit 103 calculates the optimum value of the height pixel count from the height pixel count obtained for each bone. For example, as shown in FIG. 13, a histogram of the height pixel count obtained for each bone is generated, and a large height pixel count is selected from the histogram. That is, among the plurality of height pixel counts obtained based on the plurality of bones, the height pixel count larger than the others is selected. For example, the top 30% height pixel counts are defined as valid values. In such a case, in FIG. 13, the height pixel counts calculated based on the bones B71, B61, and B51 are selected. The average of the selected height pixel counts may be obtained as the optimum value, or the maximum height pixel count may be used as the optimum value. Since the height is obtained from the length of the bone in the two-dimensional image, when the image of the bone is not captured from the front, that is, when the image of the bone is captured tilted in the depth direction with respect to the camera, the length of the bone becomes shorter than the length of the bone captured from the front. For this reason, a larger height pixel count is more likely to be calculated from the length of the bone captured from the front compared to a smaller height pixel count, and thus the larger height pixel count indicates a more likely value (greater likelihood). Thus, the larger height pixel count is used as the optimum value.

As described above, in this example embodiment, the height of the person in the real world is estimated and the state of the person can be detected in a manner similar to the first embodiment by obtaining the height pixel count based on the bones of the detected skeletal structure using the human body model showing the relationship between the bones in the two-dimensional image space and the length of the whole body. In this way, even when all the skeletons from the head to the foot cannot be acquired, the height can be estimated and the state of the person can be detected from some of the bones. In particular, by employing a larger value of the height, i.e., a larger height pixel count, which is obtained from a plurality of bones, the height can be accurately estimated and the state of the person can be detected.

Third Example Embodiment

Next, a third example embodiment will be described. In this example embodiment, in the height pixel count calculation processing according to the first example embodiment, a height pixel count is calculated by fitting a three-dimensional human body model to a two-dimensional skeletal structure. Aspects other than the height pixel count calculation processing are the same as those of the first example embodiment.

Figure 14:
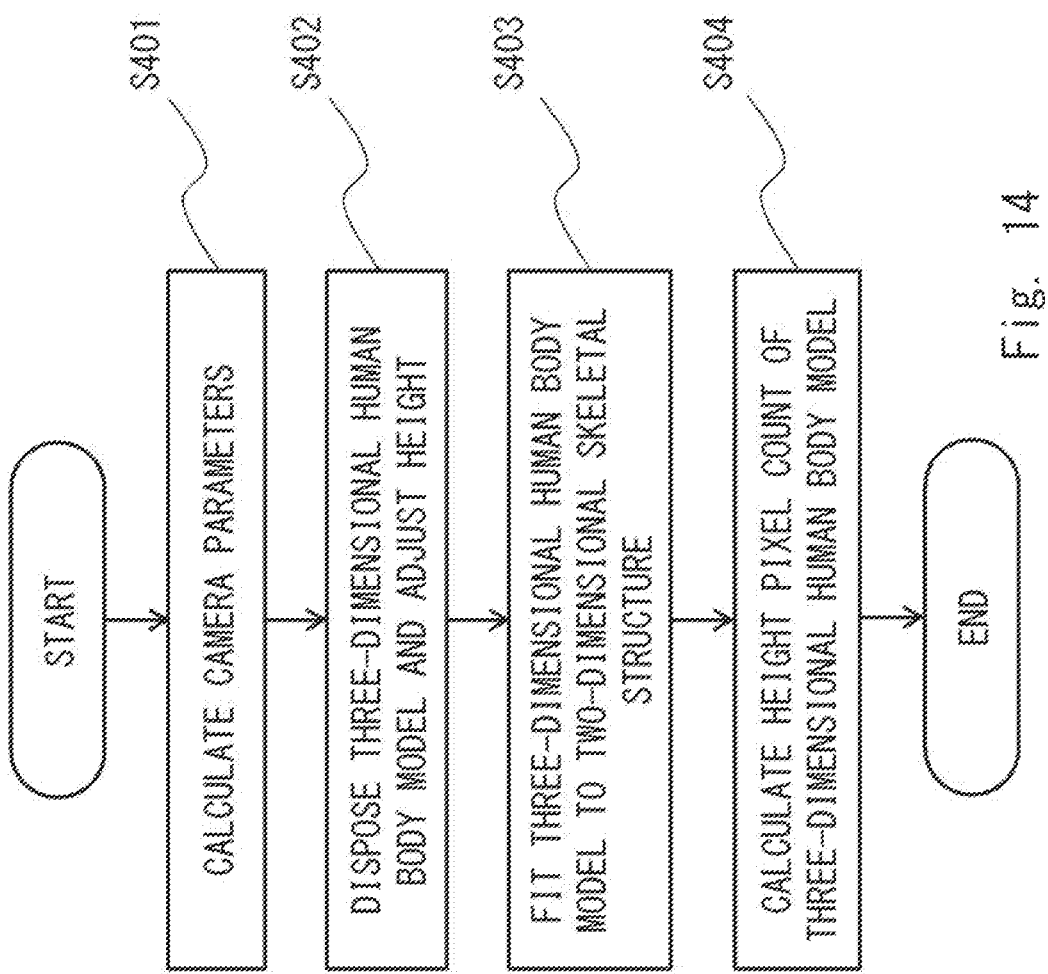
FIG. 14 is a flowchart showing a height pixel count calculation method according to a third example embodiment.

FIG. 14 shows a flow of the height pixel count calculation processing according to this example embodiment and shows a flow of the height pixel count calculation processing (S203) of FIG. 4 according to the first example embodiment. In the height pixel count calculation processing according to this example embodiment, as shown in FIG. 14, the height calculation unit 103 first calculates the camera parameters based on the image captured by the camera 200 (S401). The camera parameters are imaging parameters of the image in a manner similar to the second example embodiment. The height calculation unit 103 extracts an object whose length is known in advance from a plurality of images captured by the camera 200, and obtains the camera parameters from the size, i.e., pixel count, of the extracted object. The camera parameters may be obtained in advance, and the obtained camera parameters may be acquired if necessary. Next, the height calculation unit 103 disposes a three-dimensional human body model and adjusts a height of the a three-dimensional human body model (S402). The height calculation unit 103 prepares the three-dimensional human body model for calculating the height pixel count for the two-dimensional skeletal structure detected as in the first example embodiment, and disposes the three-dimensional human body model in the same two-dimensional image as the two-dimensional image used for detecting the two-dimensional skeletal structure based on the camera parameters. Specifically, "a relative positional relationship between the camera and the person in the real world" is specified from the camera parameters and the two-dimensional skeletal structure. For example, assuming that the position of the camera is at coordinates (0, 0, 0), the coordinates (x, y, z) of the position where the person stands or sits are specified. An image obtained by disposing the three-dimensional human body model at the same position (x, y, z) as that of the specified person is assumed and the image is captured, so that the two-dimensional skeletal structure and the three-dimensional human body model are superimposed.

Figure 15:
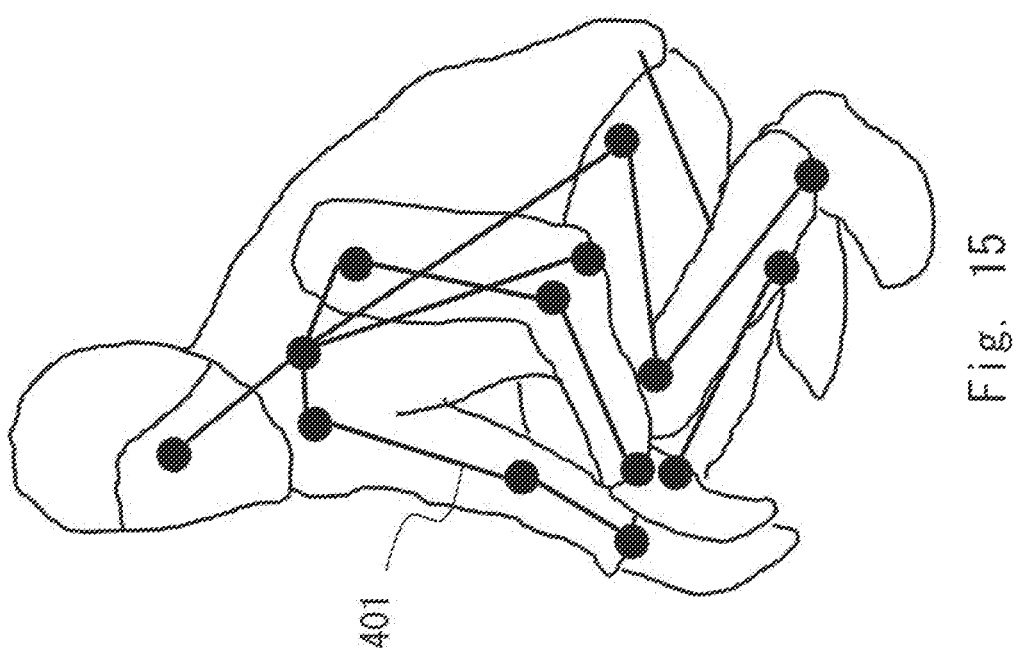
FIG. 15 shows an example of detection of a skeletal structure according to the third example embodiment.
Figure 16:
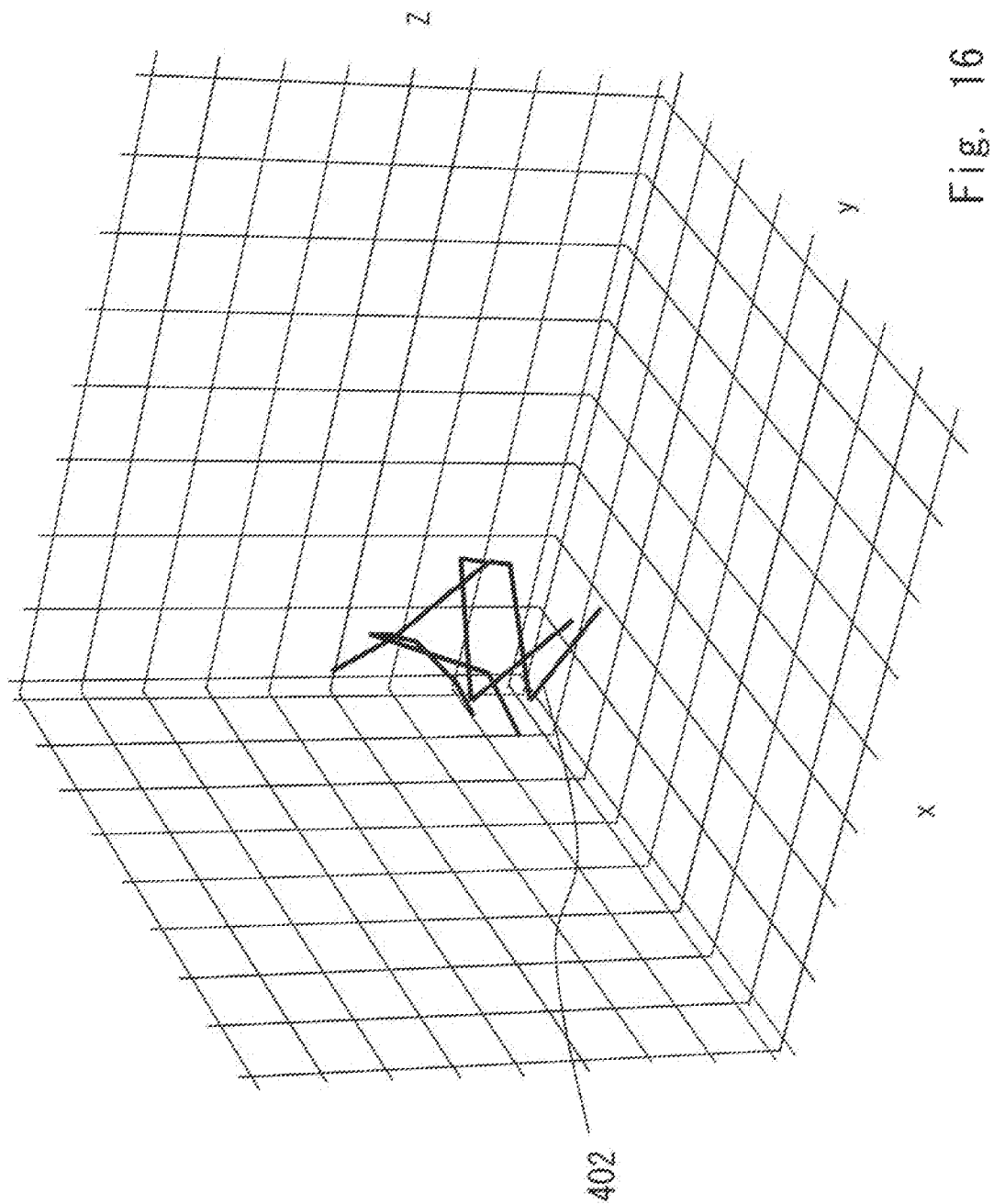
FIG. 16 shows a three-dimensional human body model according to the third example embodiment.
Figure 17:
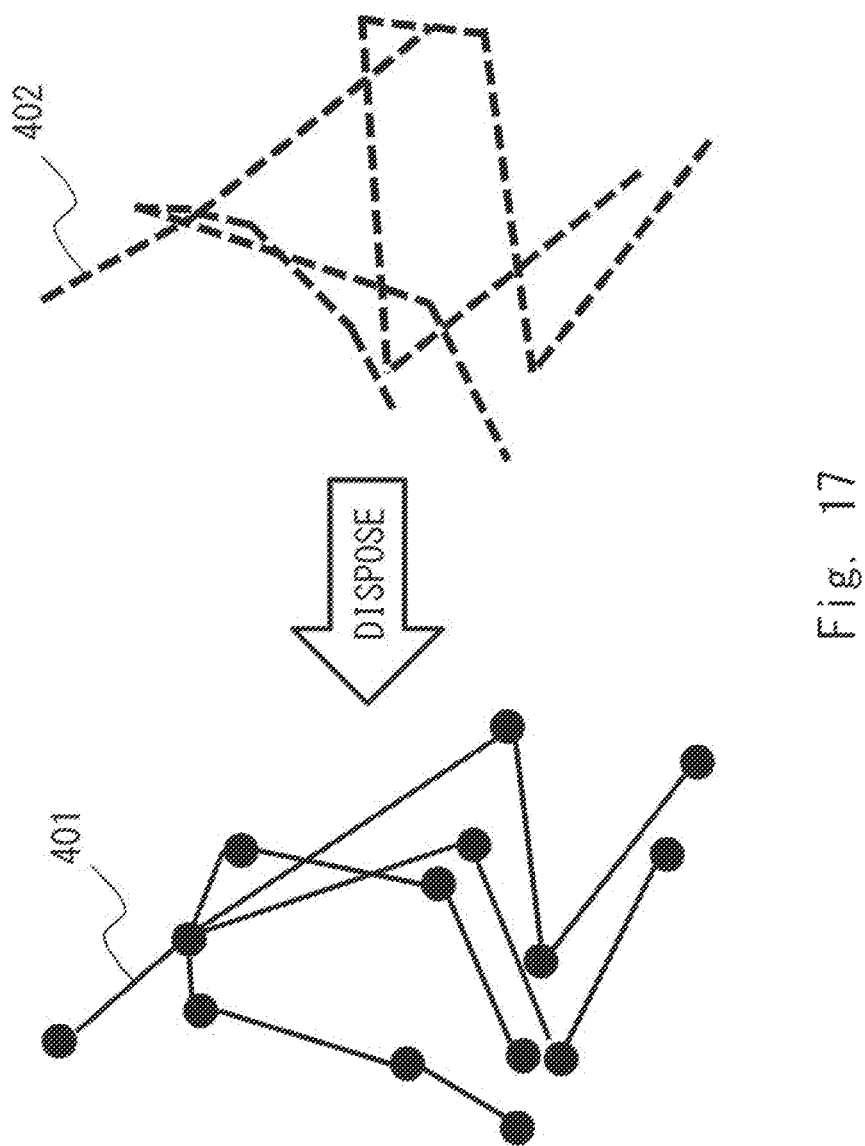
FIG. 17 is a diagram for explaining the height pixel count calculation method according to the third example embodiment.

FIG. 15 shows an example in which a person crouching down is captured from diagonally forward left to detect the two-dimensional skeletal structure 401. The two-dimensional skeletal structure 401 has two-dimensional coordinate information. It is preferable that all bones be detected, but some bones may not be detected. A three-dimensional human body model 402 as shown in FIG. 16 is prepared for the two-dimensional skeletal structure 401. The three-dimensional human body model, i.e., three-dimensional skeleton model, 402 has three-dimensional coordinate information and is a skeleton model having the same shape as that of the two-dimensional skeletal structure 401. Next, as shown in FIG. 17, the prepared three-dimensional human body model 402 is disposed and superimposed on the detected two-dimensional skeletal structure 401. The three-dimensional human body model 402 is superimposed and also adjusted so that the height of the three-dimensional human body model 402 fits to the two-dimensional skeletal structure 401.

The three-dimensional human body model 402 prepared here may be a model in a state close to the posture of the two-dimensional skeletal structure 401 as shown in FIG. 17 or a model in an upright state. For example, a technique for estimating the posture of the three-dimensional space from the two-dimensional image using the machine learning may be used to generate the three-dimensional human body model 402 of the estimated posture. By learning the information about the joints of the two-dimensional image and the joints of the three-dimensional space, the three-dimensional posture can be estimated from the two-dimensional image.

Figure 18:
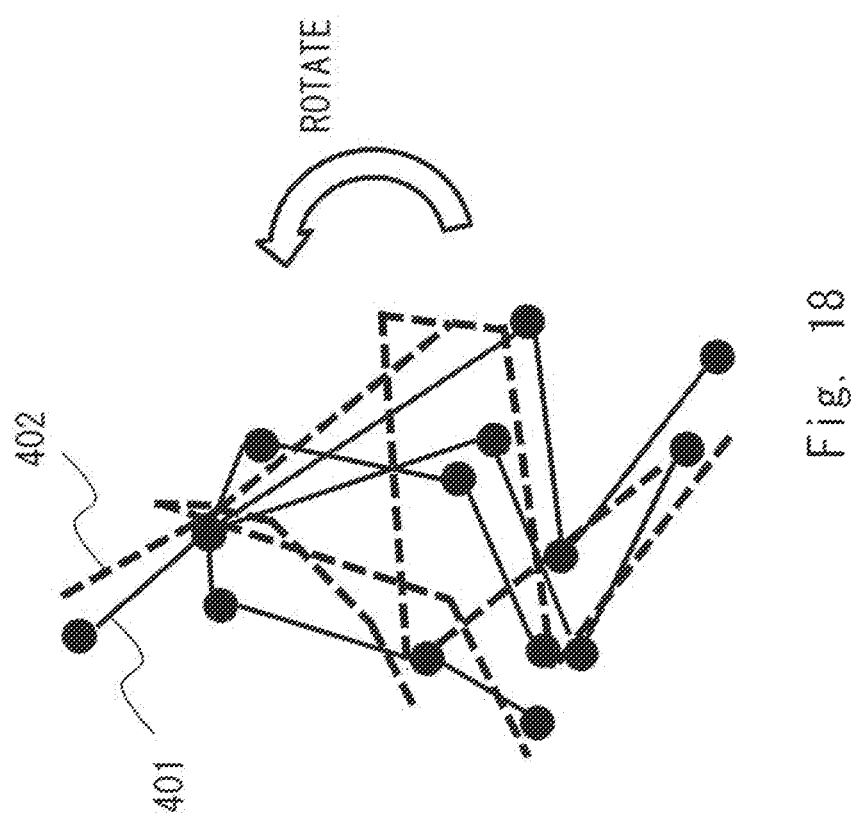
FIG. 18 is a diagram for explaining the height pixel count calculation method according to the third example embodiment.

Next, the height calculation unit 103 fits the three-dimensional human body model to the two-dimensional skeletal structure (S403). As shown in FIG. 18, the height calculation unit 103 deforms the three-dimensional human body model 402 so that the three-dimensional human body model 402 and the two-dimensional skeletal structure 401 have the same posture when the three-dimensional human body model 402 is superimposed on the two-dimensional skeletal structure 401. That is, the height, the orientation of the body, and the angles of the joints of the three-dimensional human body model 402 are adjusted and optimized so that there is no difference between the three-dimensional human body model 402 and the two-dimensional skeletal structure 401. For example, the joints of the three-dimensional human body model 402 are rotated within a movable range of the person, and the entire three-dimensional human body model 402 is rotated or the entire size thereof is adjusted. The fitting of the three-dimensional human body model and the two-dimensional skeletal structure is performed in a two-dimensional space, i.e., on the two-dimensional coordinates. That is, the three-dimensional human body model is mapped to the two-dimensional space, and the three-dimensional human body model is optimized to the two-dimensional skeletal structure in consideration of how the deformed three-dimensional human body model changes in the two-dimensional space, i.e., on the two-dimensional image.

Figure 19:
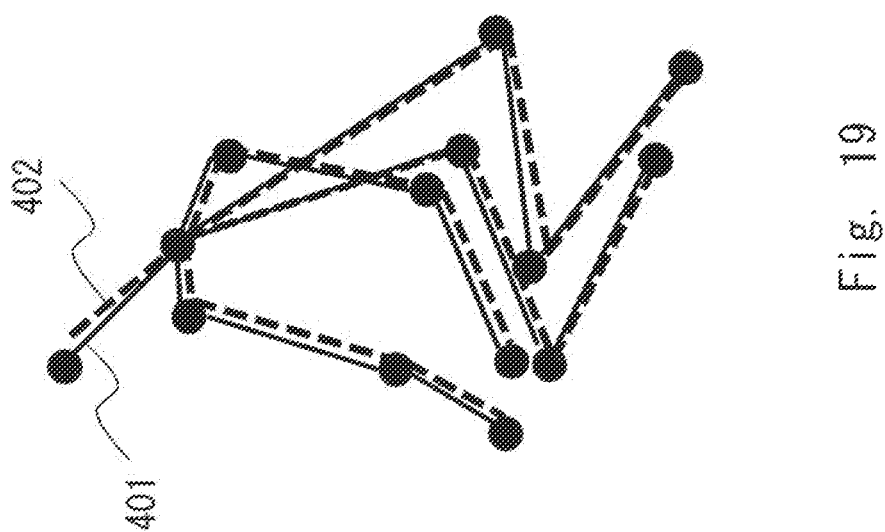
FIG. 19 is a diagram for explaining the height pixel count calculation method according to the third example embodiment.

Next, the height calculation unit 103 calculates the height pixel count of the fitted three-dimensional human body model (S404). As shown in FIG. 19, when the difference between the three-dimensional human body model 402 and the two-dimensional skeletal structure 401 is eliminated and the posture of the three-dimensional human body model 402 matches the posture of the two-dimensional skeletal structure 401, the height calculation unit 103 obtains the height pixel count of the three-dimensional human body model 402 in this state. In a state in which the optimized three-dimensional human body model 402 is made to stand upright, the length of the whole body in the two-dimensional space is obtained based on the camera parameters. For example, the height pixel count is calculated from the lengths, i.e., pixel counts, of the bones from the head to the foot when the three-dimensional human body model 402 is made to stand upright. In the manner similar to the first example embodiment, the lengths of the bones from the head to the foot of the three-dimensional human body model 402 may be summed.

As described above, in this example embodiment, the three-dimensional human body model is fitted to the two-dimensional skeletal structure based on the camera parameters, and the height pixel count is obtained based on this three-dimensional human body model, so that the height of the person is estimated and the state of the person is detected in a manner similar to the first embodiment. In this manner, even when all bones do not face the front in the image, that is, even when all bones are viewed diagonally and there is a large difference from actual lengths of the bones, the height can be accurately estimated and the state of the person can be detected. When the method according to the first to the third example embodiments is applicable, all of the methods or a combination of the methods may be used to estimate the height. In this case, a value closer to the average height of the person may be used as the optimum value.

Figure 20:
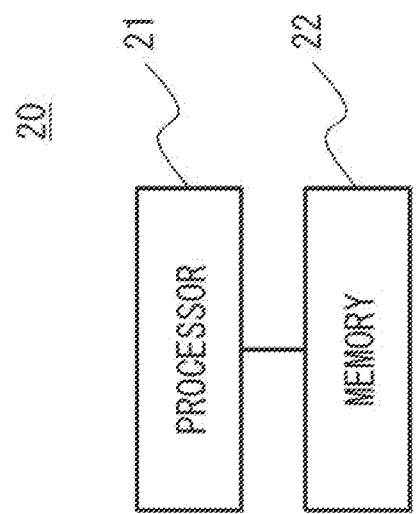
FIG. 20 is a block diagram showing an overview of hardware of a computer according to the example embodiments.

Note that each of the configurations in the above-described example embodiments is constituted by hardware and/or software, and may be constituted by one piece of hardware or software, or may be constituted by a plurality of pieces of hardware or software. The functions and processing of the person state detection apparatuses 10 and 100 may be implemented by a computer 20 including a processor 21 such as a Central Processing Unit (CPU) and a memory 22 which is a storage device, as shown in FIG. 20. For example, a program, i.e., a person state detection program, for performing the method according to the example embodiments may be stored in the memory 22, and each function may be implemented by the the processor 21 executing the program stored in the memory 22.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semi-conductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, the present disclosure is not limited to the above-described example embodiments and may be modified as appropriate without departing from the purpose thereof. For example, although a state of a person is detected in the above description, a state of an animal other than a person having a skeletal structure such as mammals, reptiles, birds, amphibians, fish, etc. may be detected.

Although the present disclosure has been described above with reference to the example embodiments, the present disclosure is not limited to the example embodiments described above. The configurations and details of the present disclosure may be modified in various ways that would be understood by those skilled in the art within the scope of the present disclosure.

The whole or part of the example embodiments disclosed above can be described as, but not limited to, the following supplementary notes.

(Supplementary Note 1)

A person state detection apparatus comprising:
acquisition means for acquiring a two-dimensional image obtained by capturing a person;
skeletal structure detection means for detecting a two-dimensional skeletal structure of the person based on the acquired two-dimensional image;
estimation means for estimating a height of the person standing upright in a two-dimensional image space based on the detected two-dimensional skeletal structure; and
state detection means for detecting a state of the person based on the estimated height of the person standing upright and a height of an area where the person is present in the two-dimensional image.

(Supplementary Note 2)

The person state detection apparatus according to Supplementary note 1, wherein
the state detection means detects the state of the person based on a ratio of the height of the person standing upright to the height of the area where the person is present.

(Supplementary Note 3)

The person state detection apparatus according to Supplementary note 2, wherein
the state detection means detects that the person is standing upright based on a result of a comparison between the ratio and a predetermined threshold.

(Supplementary Note 4)

The person state detection apparatus according to Supplementary note 2, wherein
the state detection means detects that the person is crouching down based on a result of a comparison between the ratio and a predetermined threshold.

(Supplementary Note 5)

The person state detection apparatus according to Supplementary note 2, wherein
the state detection means detects that the person is lying down based on a result of a comparison between the ratio and a predetermined threshold.

(Supplementary Note 6)

The person state detection apparatus according to any one of Supplementary notes 1 to 5, wherein
the estimation means estimates the height of the person standing upright based on a length of a bone in a two-dimensional image space included in the two-dimensional skeletal structure.

(Supplementary Note 7)

The person state detection apparatus according to Supplementary note 6, wherein
the estimation means estimates the height of the person standing upright based on a sum of the lengths of the bones from a foot to a head included in the two-dimensional skeletal structure.

(Supplementary Note 8)

The person state detection apparatus according to Supplementary note 6, wherein
the estimation means estimates the height of the person standing upright based on a two-dimensional skeleton model showing a relationship between the length of the bone and a length of a whole body of the person in the two-dimensional image space.

(Supplementary Note 9)

The person state detection apparatus according to any one of Supplementary notes 1 to 5, wherein
the estimation means estimates the height of the person standing upright based on a three-dimensional skeleton model fitted to the two-dimensional skeletal structure based on the imaging parameter of the two-dimensional image.

(Supplementary Note 10)

A person state detection method comprising:
acquiring a two-dimensional image obtained by capturing a person;
detecting a two-dimensional skeletal structure of the person based on the acquired two-dimensional image;
estimating a height of the person standing upright in a two-dimensional image space based on the detected two-dimensional skeletal structure; and
detecting a state of the person based on the estimated height of the person standing upright and a height of an area where the person is present in the two-dimensional image.

(Supplementary Note 11)

The person state detection method according to Supplementary note 10, wherein
in the detection of the state, the state of the person is detected based on a ratio of the height of the person standing upright to the height of the area where the person is present.

(Supplementary Note 12)

A person state detection program for causing a computer to execute processing of:
acquiring a two-dimensional image obtained by capturing a person;
detecting a two-dimensional skeletal structure of the person based on the acquired two-dimensional image;
estimating a height of the person standing upright in a two-dimensional image space based on the detected two-dimensional skeletal structure; and
detecting a state of the person based on the estimated height of the person standing upright and a height of an area where the person is present in the two-dimensional image.

(Supplementary Note 13)

The person state detection program according to Supplementary note 12, wherein
in the detection of the state, the state of the person is detected based on a ratio of the height of the person standing upright to the height of the area where the person is present.

(Supplementary Note 14)

A person state detection system comprising:
a camera; and
a person state detection apparatus, wherein the person state detection apparatus comprises:
acquisition means for acquiring a two-dimensional image obtained by capturing a person;
skeletal structure detection means for detecting a two-dimensional skeletal structure of the person based on the acquired two-dimensional image;
estimation means for estimating a height of the person standing upright in a two-dimensional image space based on the detected two-dimensional skeletal structure; and
state detection means for detecting a state of the person based on the estimated height of the person standing upright and a height of an area where the person is present in the two-dimensional image.

(Supplementary Note 15)

The person state detection system according to Supplementary note 14, wherein
the state detection means detects the state of the person based on a ratio of the height of the person standing upright to the height of the area where the person is present.

REFERENCE SIGNS LIST

1 PERSON STATE DETECTION SYSTEM
10 PERSON STATE DETECTION APPARATUS
11 ACQUISITION UNIT
12 SKELETAL STRUCTURE DETECTION UNIT
13 ESTIMATION UNIT
14 STATE DETECTION UNIT
20 COMPUTER
21 PROCESSOR
22 MEMORY
100 PERSON STATE DETECTION APPARATUS
101 IMAGE ACQUISITION UNIT
102 SKELETAL STRUCTURE DETECTION UNIT
103 HEIGHT CALCULATION UNIT
104 PERSON AREA CALCULATION UNIT
105 STATE DETECTION UNIT
106 STORAGE UNIT
200 CAMERA
300, 301 HUMAN BODY MODEL
401 TWO-DIMENSIONAL SKELETAL STRUCTURE
402 THREE-DIMENSIONAL HUMAN BODY MODEL

What is claimed is:

1. A person state detection apparatus comprising:
at least one memory storing instructions, and
at least one processor configured to execute the instructions stored in the at least one memory to;
acquire an image obtained by capturing a person;
detect a skeletal structure of the person based on the acquired image;

estimate a height of the person standing upright in a two-dimensional image space based on the detected skeletal structure; and detect a state, which includes at least one of a posture or an action, of the person based on the estimated height of the person standing upright and a height of an area where the person is present in the image.

2. The person state detection apparatus according to claim 1, wherein
the at least one processor is further configured to execute the instructions stored in the at least one memory to detect the state of the person based on a ratio of the height of the person standing upright to the height of the area where the person is present.

3. The person state detection apparatus according to claim 2, wherein
the at least one processor is further configured to execute the instructions stored in the at least one memory to detect that the person is crouching down based on a result of a comparison between the ratio and a predetermined threshold.

4. The person state detection apparatus according to claim 2, wherein
the at least one processor is further configured to execute the instructions stored in the at least one memory to detect that the person is lying down based on a result of a comparison between the ratio and a predetermined threshold.

5. The person state detection apparatus according to claim 1, wherein
the at least one processor is further configured to execute the instructions stored in the at least one memory to estimate the height of the person standing upright based on a length of a bone in an image space included in the skeletal structure.

6. The person state detection apparatus according to claim 5, wherein
the at least one processor is further configured to execute the instructions stored in the at least one memory to estimate the height of the person standing upright based on a sum of the lengths of the bones from a foot to a head included in the skeletal structure.

7. The person state detection apparatus according to claim 5, wherein
the at least one processor is further configured to execute the instructions stored in the at least one memory to estimate the height of the person standing upright based on a skeleton model showing a relationship between the length of the bone and a length of a whole body of the person in the image space.

8. The person state detection apparatus according to claim 1, wherein
the at least one processor is further configured to execute the instructions stored in the at least one memory to estimate the height of the person standing upright based on a three-dimensional skeleton model fitted to the skeletal structure based on the imaging parameter of the image.

9. The person state detection apparatus according to claim 1, wherein
the at least one processor is further configured to execute the instructions stored in the at least one memory to detect the state of the person based on a result of a comparison between a predetermined threshold and a ratio of the height of the person standing upright to the height of the area where the person is present.

10. A person state detection method comprising:
acquiring an image obtained by capturing a person;
detecting a skeletal structure of the person based on the acquired image;
estimating a height of the person standing upright in an image space based on the detected skeletal structure; and
detecting a state, which includes at least one of a posture or an action, of the person based on the estimated height of the person standing upright and a height of an area where the person is present in the image.

11. The person state detection method according to claim 10, wherein
the person state detection method further comprises detecting the state of the person based on a ratio of the height of the person standing upright to the height of the area where the person is present.

12. The person state detection method according to claim 11, wherein
the person state detection method further comprises detecting that the person is crouching down based on a result of a comparison between the ratio and a predetermined threshold.

13. The person state detection method according to claim 11, wherein
the person state detection method further comprises detecting that the person is lying down based on a result of a comparison between the ratio and a predetermined threshold.

14. The person state detection method according to claim 10, wherein
the person state detection method further comprises estimating the height of the person standing upright based on a length of a bone in an image space included in the skeletal structure.

15. The person state detection method according to claim 14, wherein
the person state detection method further comprises estimating the height of the person standing upright based on a sum of the lengths of the bones from a foot to a head included in the skeletal structure.

16. The person state detection method according to claim 14, wherein
the person state detection method further comprises estimating the height of the person standing upright based on a skeleton model showing a relationship between the length of the bone and a length of a whole body of the person in the image space.

17. The person state detection method according to claim 10, wherein
the person state detection method further comprises estimating the height of the person standing upright based on a three-dimensional skeleton model fitted to the skeletal structure based on the imaging parameter of the image.

18. The person state detection method according to claim 10, wherein
the person state detection method further comprises detecting the state of the person based on a result of a comparison between a predetermined threshold and a ratio of the height of the person standing upright to the height of the area where the person is present.

19. A non-transitory computer readable medium storing a program for causing a computer to execute processing of:
acquiring an image obtained by capturing a person;
detecting a skeletal structure of the person based on the acquired image;

estimating a height of the person standing upright in an image space based on the detected skeletal structure; and detecting a state, which includes at least one of a posture or an action, of the person based on the estimated height of the person standing upright and a height of an area where the person is present in the image.

20. The non-transitory computer readable medium according to claim 19, wherein the program further causes the computer to execute processing of detecting the state of the person based on a result of a comparison between a predetermined threshold and a ratio of the height of the person standing upright to the height of the area where the person is present.

* * * * *